United States Patent [19]

Koivunen

[11] Patent Number: 5,031,746
[45] Date of Patent: Jul. 16, 1991

[54] MULTI-MODE CLUTCH FOR CHANGE-SPEED TRANSMISSIONS

[76] Inventor: Erkki Koivunen, 15560 Westbrook, Livonia, Mich. 48154

[21] Appl. No.: 501,473

[22] Filed: Mar. 30, 1990

[51] Int. Cl.$^5$ .............................................. F16D 19/00
[52] U.S. Cl. .................................. 192/85 AA; 192/52; 192/54
[58] Field of Search ............. 192/52, 54, 41 R, 104 F, 192/85 AA

[56] References Cited

U.S. PATENT DOCUMENTS

| | | | |
|---|---|---|---|
| 2,702,618 | 2/1955 | Baker et al. | 192/85 AA |
| 2,720,866 | 10/1955 | Maki et al. | 192/85 AA |
| 2,766,864 | 10/1956 | Schilling et al. | 192/54 |
| 3,265,175 | 8/1966 | Croswhite | 192/109 F |
| 3,511,349 | 5/1978 | Herscovici | 192/56 F |
| 3,719,259 | 3/1973 | Burcz et al. | 192/54 |
| 4,083,442 | 4/1987 | Ushijima | 192/85 AA |
| 4,089,396 | 5/1978 | Quick | 192/56 F |
| 4,308,940 | 1/1982 | Cadee | 192/103 FA |
| 4,325,471 | 4/1982 | Schuster | 192/85 AA |
| 4,442,929 | 4/1984 | Uchida | 192/52 |
| 4,458,797 | 7/1984 | Hawkins | 192/52 |
| 4,713,984 | 12/1987 | Ohkubo | 192/85 AA |

Primary Examiner—Allan D. Herrmann
Assistant Examiner—Nicholas Whitelaw
Attorney, Agent, or Firm—Charles R. White

[57] ABSTRACT

An automatic change speed transmission with a multi-mode friction device which is torque sensitive to operatively hold transmission gearing for reaction in a drive direction and automatically self releases in the manner of a one way or free-wheeler clutch on torque reversals to provide inherent smooth shifting between the ratios. This clutch can also be fully locked to provide engine braking in coast operation. In the released mode, the multi-mode clutch is fully released in both drive and coast direction. With this multi-mode clutch the transmission length can be foreshortened significantly and existing transmissions can be readily and economically converted from conventional friction element shifts to free-wheeler type shifts. This multi-mode clutch can also be used to selectively couple and release two rotatable members.

20 Claims, 6 Drawing Sheets

FIG. 1

| RANGE | GEAR | MULTI-MODE CLUTCH MODE (90) | | | OTHER CLUTCHES | | | |
|---|---|---|---|---|---|---|---|---|
| | | ONE-WAY 4a | FULL LOCK | RELEASE 4 | FORWARD (22) | DIRECT (80) | REVERSE (70) | LOW ONE-WAY (62) |
| DRIVE | FIRST | | | ON | ON | OFF | OFF | ON |
| | SECOND | ON | | | ON | OFF | OFF | OFF |
| | DIRECT | | | ON | ON | ON | OFF | OFF |
| INTERM. | FIRST | | | ON | ON | OFF | ON | ON |
| | SECOND | | ON | | ON | OFF | OFF | OFF |
| LOW | FIRST | | | ON | ON | OFF | OFF | ON |
| REVERSE | | - | | ON | OFF | ON | ON | OFF |

FIG.4 - RELEASE MODE

FIG.4a - DRIVE MODE

FIG.4b - COAST BRAKING MODE

FIG.5b
Clutch applied

FIG.5a
Clutch released

MULTI-MODE CLUTCH FOR CHANGE-SPEED TRANSMISSIONS

TECHNICAL FIELD

This invention relates to power transmission and friction devices for controlling the speed and torque ratios of automatic transmission gearing, and more particularly to a torque direction sensitive friction clutch for such gearing which has a plurality of operative modes for automatically effecting smooth and efficient ratio transition during transmission upshifts and downshifts in the manner of a one way roller clutch and for foreshortening the overall lengths of various transmission designs.

BACKGROUND OF THE INVENTION

For smooth change-ratio shifts in automatic transmissions, it is necessary that the off-coming or disengaging clutch precisely releases when the on-coming or engaging clutch has reached sufficient capacity to carry the required torque. In the sequence of events during a typical shift, this transition happens at the end of the torque phase of a shift. At this point the torque in the off-coming clutch is reversed and this clutch must be released to prevent a tie-up or excessive overlap in the transmission gearing and a resulting sagging shift. Conversely, an early release of the off-coming clutch before the on-coming clutch engages will result in an engine flare and a harsh and jerky shift.

To provide for shifts in which sagging and harshness are minimized, various shift transition mechanisms, conditioned by inputs from a wide range of controls, have been utilized to selectively frictionally hold or drivingly connect different components of planetary gear sets found in most transmission designs. Among these mechanisms are one-way roller or free-wheeler type clutches which automatically hold in one direction to provide reaction for transmission gearing and which release automatically on torque reversal.

Such one-way clutches are generally considered to be the most highly efficient and effective control mechanisms since they are direction sensitive and are inherently operationally efficient and accurate. However, since one-way clutches have torque capacity in only one direction, an additional selectively engageable friction clutch must be provided to inhibit overrun for purposes such as engine braking. Furthermore, if used as an intermediate clutch such one-way clutches must be free to turn in an opposite direction in low gear. This necessarily requires another clutch in series with the intermediate one-way clutch drive for intermediate to low range shifts. Such additional clutch construction adds to the overall length of the transmission so that it cannot be readily used in many instances where a short length transmission is required. For example, transverse engine-transmission power packages in crowded forward compartments of front wheel drive vehicles require foreshortened transmissions.

In addition to one-way clutches, single or dual wrapped friction bands are often used to selectively lock rotation of components of planetary gearing of the transmission for establishing a ratio. While such bands are effective holding devices and characteristically have a low torque capacity in a de-energized direction so that tie ups with an on-coming clutch are minimized, they are difficult to control and cannot be relied on to produce consistent, high quality ratio shifts.

A third type of friction drive device known as multiple plate clutches have been utilized for controlling planetary transmission gearing. However, smooth shifting off of such multiple plate clutches necessitates intricate and costly controls so that use is restricted to a limited number of applications. Also, Since the shift quality from such multi-plate clutches is often inconsistent, excessive clutch plate wear and poorly timed shifts and engine flair are often experienced.

To improve shifts in a multi-ratio change speed transmission, the present invention incorporates the best operational characteristics of the prior shift mechanisms and particularly those of a one-way roller clutch into a multi-mode friction clutch. This clutch is a multi-mode unit that can effectively function in a one way drive mode of operation to hold a reaction member of planetary gearing in one direction to smoothly establish a ratio and release automatically at torque reversal in the manner of a one-way roller or free-wheeler clutch for smooth shifts. The multi-mode clutch of this invention can also function in a two way locking mode to hold a component of the planetary gearing in both drive and coast direction. With coast locking, the multi-mode clutch provides engine braking. Additionally, the multi-mode clutch of this invention can be fully released for rotation in either direction allowing other friction devices in the transmission to establish the drive ratios. This clutch can be employed to selectively connect and release two rotatable members as needed in some transmission designs.

In a preferred embodiment of the present invention, the multi-mode clutch incorporates an annular piston-like, torque sensitive reaction plate that is associated with a hydraulically actuated piston movable by apply pressure fed to an apply chamber, and that carries friction plates which are interleaved with friction plates operatively connected to a planetary gear set member for establishing a drive through the transmission. The torque sensitive reaction plate is moved by a torque responsive wedging actuator and by the opposing force of pressure in the apply chamber to control the area of an exhaust opening leading from the chamber thereby controlling the apply pressure within the chamber for the piston so that the capacity of the clutch is controlled to improve transition in ratio shifts.

With the multi-mode clutch of this invention, compactness is provided so that friction bands and free wheeler and other overrun clutch devices such as sprag clutches can be eliminated or reduced in number. This allows substantial foreshortening of overall transmission length such as by 50-60 mm in some designs, for example, so that it can be readily used in a transversely mounted power package for vehicles. With the multi-mode clutch of this invention, costs are lowered while design flexibility is enhanced since the multi-mode clutch is particularly effective in utilizing available space within a transmission case.

The clutch of this invention is applicable to both stationary and rotating type clutches, accordingly, the term clutch as used in this specification defines a friction device that selectively brakes and holds a member to ground or selectively drivingly connects two members for rotation together. The multi-mode clutch of this invention can be readily employed to convert existing transmissions from a band to a free wheeler shift without major alterations.

DETAILED DESCRIPTION OF THE DRAWINGS

Figure 1:
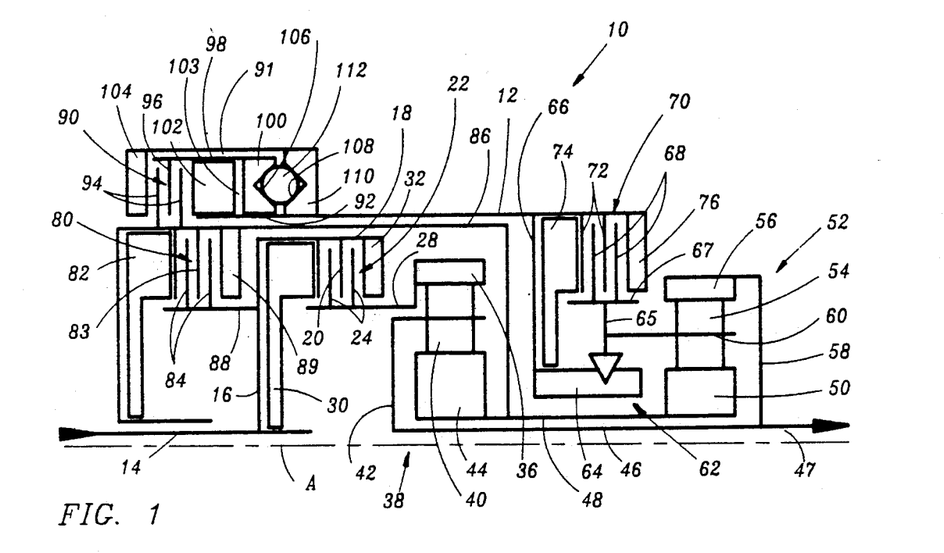
FIG. 1 is a schematic diagram of an automatic transmission having three speeds forward and one-speed reverse.

Turning now in greater detail to the drawings, there is diagrammatically shown in FIG. 1 the upper half of an automatic change speed transmission 10 for a motor vehicle having a generally cylindrical and stepped diameter outer casing 12 and having an input shaft 14 adapted to be driven by the output of an engine through a torque convertor or coupling, which are not shown. The input shaft 14 extends coaxially with the centralized longitudinal axis A of the transmission 10 and is drivingly connected to an internal drum 16 which has an outer cylindrical wall 18 to which annular friction plates 20 of a forward drive clutch 22 are splined by tangs formed on their outside diameters. These friction plates are interleaved with annular friction plates 24 which are splined at their inner diameters to the periphery of a small diameter wall of a cylindrical hub 28 extending axially in the casing 10 from the forward drive clutch 22 and providing an output therefor.

The plates of the forward drive clutch 22 are frictionally engaged by action of a hydraulically operated piston 30 which strokes in an associated chamber to force the friction plates against a reaction backing plate 32 secured at its outside diameter to the cylindrical wall 18 of the drum 16. Conventional return springs move the piston 30 to an off position when the pressure is relieved from the piston chamber to effect release of the forward clutch 22.

When engaged, the forward clutch transmits engine generated torque from the input shaft 14 to the hub 28 which is drivingly connected to a ring gear 36 of a first planetary gear set 38. This planetary gear set has planet gears 40, mounted on a carrier 42, which mesh with the ring gear 36 and a sun gear 44. The carrier 42 drivingly connects to an elongated drive shaft 46 that extends axially in the casing 12 about the central longitudinal axis A into drive connection with a transmission output shaft 47.

The sun gear 44 of planetary gear set 38 is connected by drive shaft 48, concentric with axis A and drive shaft 46, to the sun gear 50 of a rear planetary gear set 52. The sun gear 50 drivingly meshes with planet gears 54 that in turn mesh with an associated ring gear 56. The ring gear 56 is connected by a rear hub 58 to the transmission output shaft 47. The planetary gears 54 are rotatably mounted on a carrier 60 which connects to the outer race of a one-way roller clutch 62.

This one-way clutch 62 has an inner race 64 which connects to ground provided by the transmission case 12 through the bulkhead 66. The one-way clutch automatically provides ground for the carrier 60 for first range drive and automatically releases in second and direct drive. The outer race of the one-way roller clutch 62 is connected to a center web 65 of a drum 67, the peripheral outer wall of which has friction plates 68 splined thereto of an overrun/reverse clutch 70. These friction plates are interdigitated with the friction plates 72 of the clutch 70 which are splined at their external diameters to the inside of the transmission casing 12.

With this construction, the planetary carrier 60 can be held by application of the overrun/reverse clutch 70 through a hydraulically operated piston 74 operatively mounted in a piston chamber which frictionally engages the friction plates forcing them against the reaction plate 76 secured to the transmission casing 12. Clutch 70 is also applied in manual low gear to hold sun gear 50 stationary to provide for engine braking in coast.

The drive shaft 48 can selectively be driven through application of a direct clutch 80 by hydraulic application of piston 82 which effects the friction driving engagement of the interleaved friction plates 83, 84 respectively splined to a large diameter cylinder 86 for clutch 80 and a plate support hub 88 of drum 16. Piston 82 strokes under pressure from apply fluid in its chamber to effect the frictional engagement of the friction plates 83, 84. Annular plate 89 fastens to the cylinder 86 forming the backing for the friction plates.

The cylinder 86 is held stationary for intermediate or second range drive by one-way locking operation of the multi-mode intermediate clutch 90 of this invention operatively mounted in annular chamber 91 within the transmission case. As shown in FIG. 1, a cylindrical wall 92 attached to annular radial bulkhead 110 projects axially to form the inner diameter of chamber 91. Friction plates 94 are splined to the outer surface of cylinder 86. These plates are interleaved with friction plates 96 that have peripheral tangs splined in axially extending and arcuately spaced slots in the outboard end of a cylindrical wall 98 of a piston-like reaction plate 100. The reaction plate has a disc-like base plate or body extending radially inward to the outer periphery of the cylindrical wall 92.

A hydraulically actuated piston 102 is operatively mounted in the housing provided by the reaction plate 100 and cylindrical wall 92 and cooperates therewith to form a pressure chamber 103 which can be pressure charged with transmission fluid with transmission fluid from controls described below to stroke the piston 102 and effect the engagement of the interleaved friction plates 94, 96 with a backing plate 104 that is secured to the interior of the casing 12.

The reaction plate 100 has a series of arcuately spaced conical cavities 106 formed in the outer wall of the base plate which face corresponding arcuately spaced conical cavities 108 in the annular bulkhead 110 extending radially inward from connection with the inner wall of the transmission case 12. These interfacing conical cavities 106, 108, of which only one set is shown, open toward each other to operationally house spherical actuator balls 112 therein. With this construction, a direction sensitive camming action is provided which effects the axial movement of the reaction plate as it is turned in one direction. A pin and slot connection 114, 116 shown in FIGS. 3, 4, and 4a operative between the bulkhead 110 and the reaction plate 100 prevents the rotation of the reaction plate in the opposite direction so that this multi-mode clutch construction operates automatically in the manner of a one-way roller or sprag clutch.

As shown best in FIGS. 2, 3, 4 and 4a, the reaction plate 100 is mounted for simultaneous limited turning and axial shifting movement in a drive direction in the annular cavity 91 formed in the case and associated bulkhead. This movement results from the initial frictional engagement of clutch plates 94, 96 and the camming action of the balls 112 in their conical cavities under certain operating conditions that will be described. The reaction plate 100 in FIG. 4 cannot be turned a direction opposite to the drive direction on torque reversal because the pin 114 extending from the bulkhead bottoms in the end of slot 116 formed in the outer base of the reaction plate 100. Accordingly, when the reaction plate is in the FIG. 4 position, the pin and slot prevents the clutch plates from engaging by reaction plate action on such torque reversal.

Figure 3:
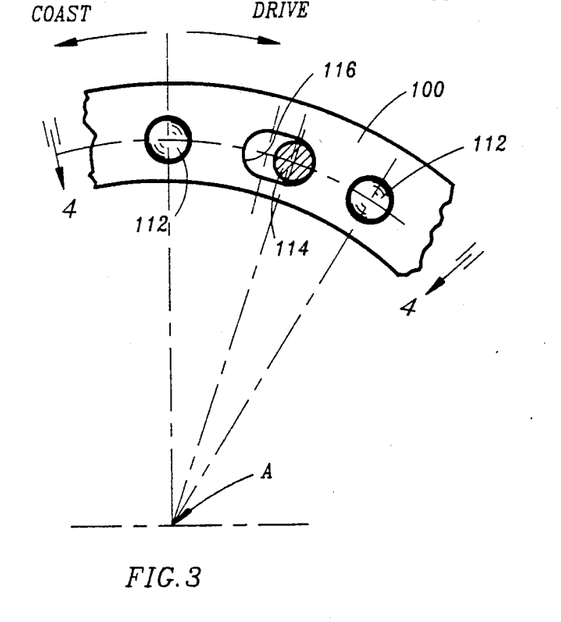
FIG. 3 is a sectional view taken generally along sight lines 3—3 of FIG. 2 showing a portion of a torque sensing reaction plate of the multi-mode clutch of this invention.
Figure 4:
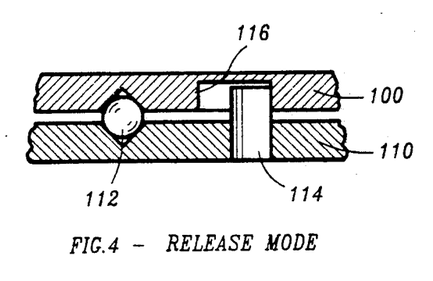
FIG. 4 is a view taken generally along sight lines 4—4 of FIG. 2 showing the torque sensing reaction plate i a retracted or released operational mode.

More particularly, FIG. 4 shows the cylindrical stop pin 114 anchored in bulkhead 110 of the transmission case projecting axially into an elongated arcuate recess or slot 116 milled into the outer face of the reaction plate. This pin and slot connection is arcuately spaced from the ball 112 and its conical cavities 106 and 108 and is operative to limit the relative rotation of the reaction plate within its chamber 91 in casing 12. When the pin 114 is bottomed in slot 116 on torque reversal as illustrated in FIGS. 3 and 4, the reaction plate 100 cannot turn counterclockwise into the coast direction. With turning inhibited, no camming action will occur and the reaction plate leaves an exhaust control port 132 open and the connected chamber 103 exhausted. When the shift is from the drive mode of FIG. 4a to the release mode of FIG. 4, the multi-mode clutch self-releases in an automatic smooth manner of a one way clutch.

Figure 4A:
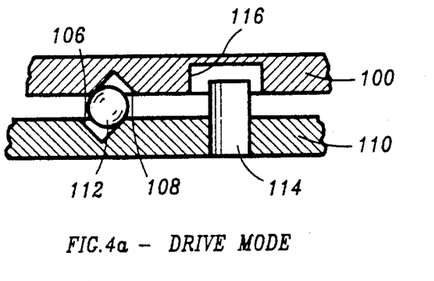
FIG. 4a is a view similar to that of FIG. 4 showing the reaction plate displaced to a locked position for a drive operational mode.
Figure 4B:
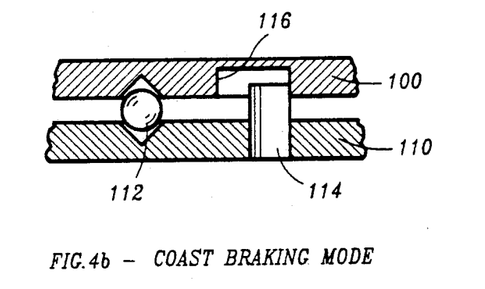
FIG. 4b is a view similar to that of FIG. 4 showing the reaction plate in a coast braking mode.

The pin illustrated in FIG. 4a is shown in its slot in the drive mode so that the increasing torque developing in the friction plates 94, 96 causes the reaction plate to turn in the drive direction and be cammed axially to progressively reduce the pressure fluid exhaust area of the exhaust control port 132. Accordingly, with pressure fed from the controls into chamber 103 and with the exhaust port 132 being restricted, pressure builds in chamber 103 to increase the torque capacity of the engaging clutch plates. As will be later described, the pressure in chamber 103 is regulated by the opposing forces of hydraulic pressure in chamber 103 and the mechanical force of the balls 112 in the camming cavities controlling the position of the reaction plate and varying the area of the exhaust control port 132 so that apply pressure and clutch capacity are matched with the torque that the clutch carries for optimizing ratio shifts.

Figure 1A:
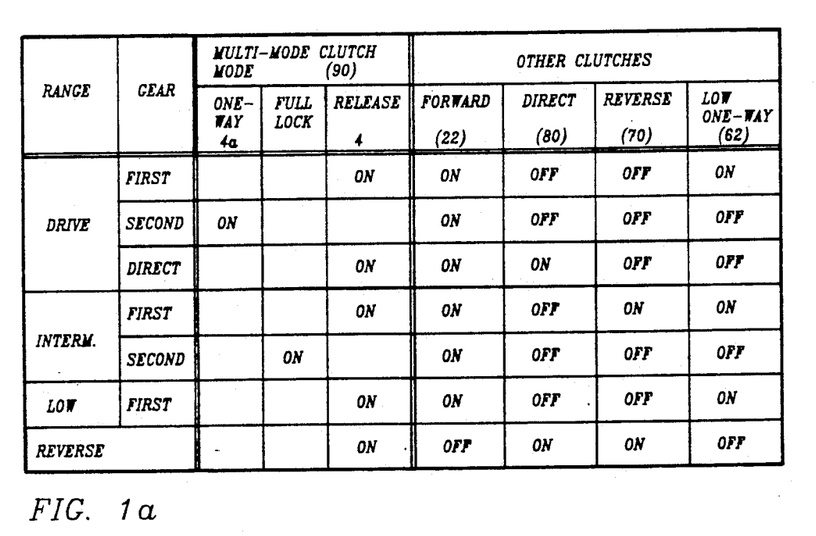
FIG. 1a is a chart keying the operation of the transmission of FIG. 1 to the application and release of various clutches illustrated.

The multi-mode clutch 90 accordingly functions in three distinctive operational modes for effecting smooth ratio shifting and efficient transmission performance. This includes a one-way locking mode for drive (FIG. 4a), full locking mode for manual range for engine braking (clutch plates engaged without reaction plate reaction), and release mode for full clutch release (FIG. 4). The chart of FIG. 1A identifies the respective clutches applied in the transmission of FIG. 1 to establish low, intermediate, direct and reverse drive. This chart also indicates the frictional engagement and the release of the Forward, Direct, Reverse and one-way clutches as well as the mode operation of the multi-mode clutch in Drive, Intermediate, Low and Reverse ranges.

Figure 2:
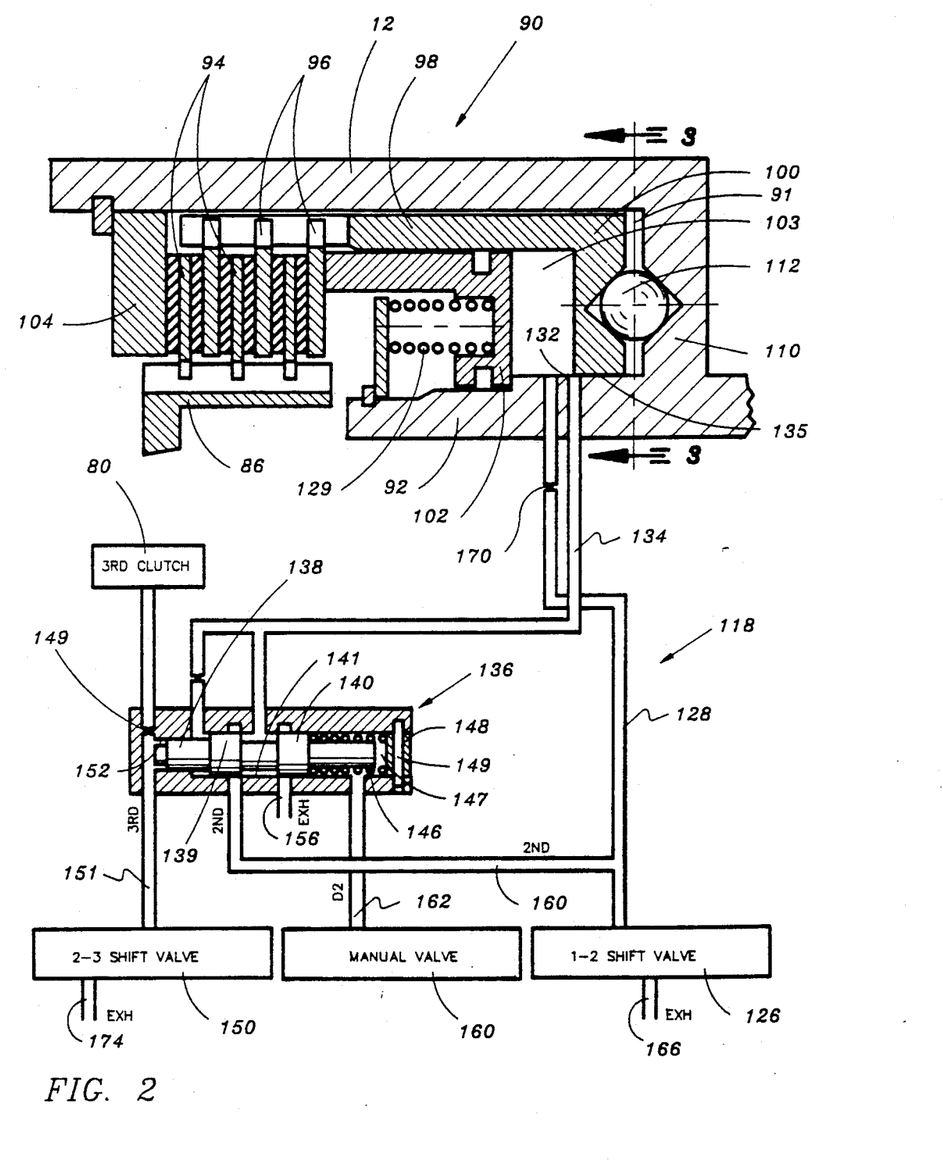
FIG. 2 is a schematic diagram of a portion of hydraulic controls and the associated multi-mode second and the third clutch of the transmission of FIG. 1.

FIG. 2 illustrates the multi-mode clutch 90 in greater detail as operated by an associated hydraulic control unit schematically illustrated at 118. The hydraulically actuated piston 102 is nested for power stroking movement within the reaction plate and, in conjunction with this plate and the cylindrical wall 92 of bulkhead 110 of the casing, forms the hydraulic chamber 103 that can be supplied with pressure oil from the 1-2 shift valve 126 through a feed line 128 which connects into the chamber 103. When the pressure fluid fed into this chamber through orifice 170 exerts sufficient force on the piston 102 it strokes so that the friction plates 94, 96 of the multi-mode clutch are frictionally engaged. Conventional return springs 129 move the piston 102 to an off position on relief of pressure from chamber 103.

Pressure in this chamber 103 is controlled by the diameter of orifice 170 in feed line 128 and the reaction plate position relative to port 132 drilled through cylindrical shoulder 92 that is connected to an exhaust control line 134. More particularly, the interdiametral inner surface 135 of the body of the reaction plate 101 is adapted to move across the port 132 to control the area of opening thereof from a maximum open position to a position in which the port is almost fully closed. With the area of exhaust port controlled, pressure and apply forces developed in apply chamber 103 are controlled.

The exhaust line 134 feeds to an exhaust control valve 136 incorporating a spool valve 138 having spaced lands 139 and 140 and mounted for shifting movement in a bore 141 in valve body 142. The exhaust control spool valve 136 is urged to shift to an exhaust position against the force of helical spring 146 in spring pocket 147 (closed by plug 148 and anchored by pin 149) by the feed of pressure fluid from a 2-3 shift valve 150 when upshifted so that third clutch apply oil is directed through line 151 and orifice 149 to the piston chamber of the third clutch 80. The pressure in line 151 provides a force that acts across the diametral outer end 152 of the spool valve element forcing the spool valve 138 to shift against spring 146 to position valve lands 139 and 140 so that the exhaust line 134 and the piston chamber 103 are open to an exhaust port 156.

When the 2-3 shift valve downshifts, the third clutch apply chamber begins to exhaust and the spring 146 of the exhaust control valve 136 shifts the spool valve to the left to its regulating position allowing valve 136 to regulate an enabling or tickling pressure, a low pressure such as 5 psi in line 134 and chamber 103. With tickling pressure in chamber 103, the piston will stroke to effect some slight drag in the friction plates 94, 96. With torque to the multi-mode clutch reversed and with this low enabling pressure, the pressure in apply chamber 103 subsequently rapidly increases in the downshift transition so that the multi-mode clutch makes the transition from the release mode to the drive mode for a smooth and well timed downshift.

The control also includes manual valve 160 selectively positioned by the vehicle operator to select automatic change speed operation or a selected drive range. For example, if the manual valve is shifted into the second range drive, second drive oil pressure is supplied to the spring pocket 147 to shift the exhaust control spool valve to the left to connect the exhaust control line 134 with passage 160 joining with passage 128.

As shown, the exhaust control valve 136 is hydraulically interconnected between the 1-2 shift valve 126, manual valve 160 and 2-3 shift valve 150 and the multi-mode clutch 90. The control valve 136 has a plurality of distinct operations.

When the control valve is regulating the enabling or tickling pressure, the spool valve 138 is in a spring balanced centered position to regulate a constant enabling pressure in the multi-mode clutch chamber 103. This tickling pressure enables the multi-mode clutch to become self-locking and hydraulically corresponds to the mechanical action of the accordion or energizing springs of a conventional one-way roller clutch. The magnitude of the force of this initiating or enabling pressure exerted on piston 102 is determined by the force of spring 129 and the friction in the system.

When the 2-3 shift valve has upshifted for transition from second to third gear, the spool valve 138 is displaced to the right by the force of pressure fed to clutch 80 to open the exhaust control oil passage 134 to exhaust 156. This allows the piston chamber 103 to be exhausted and removes even the initiating or tickling pressure as otherwise generated by valve 136. This release of pressure in chamber 103 eliminates or sharply reduces drag between the clutch plates of the multi-mode clutch in third range.

For engine braking, the manual valve 160 is manually moved to intermediate range by the vehicle operator so that the spool valve 138 is displaced to the left by D2 or intermediate range pressure oil fed from the manual valve via the line 162. When the spool valve 138 is shifted to the left, the exhaust control passage 134 is open to the second range oil through the line 160 connected between the 1-2 shift valve and the passage 128. Both clutch apply and exhaust lines are thus connected to second oil in this mode. The multi-mode clutch resultantly converts from a one-way clutch to a conventional multi-plate clutch operation which locks in both drive and coast directions so that engine braking is available. In this full lock mode, the reaction plate is in the FIG. 4 position.

With this invention, a power 1-2 automatic shift occurs as the transmission shifts from the first gear with the roller clutch 62 holding the reaction member provided by the carrier of the rear gear set, to the second gear where sun gear 44 is held stationary by multi-mode clutch 90. Before this shift, the 1-2 shift valve 126 is in the downshifted position and the spring 146 in the exhaust control valve 136 holds the spool valve 138 in the leftward position. Under these conditions, the exhaust control line 134 is connected with the second oil passage 160 which, in turn, is open to exhaust at the exhaust 166 in the downshifted 1-2 valve. With chamber 103 open to exhaust, the multi-mode clutch is released and the transmission is in the first gear drive.

In power shifting into second ratio, the 1-2 shift valve moves to an upshift position and second drive oil supplied through the shift valve 126 feeds into chamber 103 through line 128. Pressure begins to build up in the piston chamber 103. Pressurized second oil through line 160 activates the exhaust control valve 136 which regulates a constant enabling pressure in line 134 and connected chamber 103 dependent on the force of spring 146. The hydraulically actuated piston 102 overcomes the force of return springs 129 and thrusts against the clutch plates 94, 96 which initially produces a small amount of drag that conditions the multi-mode clutch for a self-generating mode of operation.

Accordingly, the drag torque of the lightly engaged clutch plates is transmitted through the reaction plate 100 and causes the reaction plate to rotate in the counterclockwise direction. Resultantly, the camming balls 112 acting against the ramp of the conical depressions 106 and 108 displaces the reaction plate 100 to the left. At this point, the clutch plates 94 are turning in a reverse direction and the piston chamber 103 experiences increased pressure from the shift valve 126. As the torque of the multi-mode clutch increases, the reaction torque of the one-way clutch 62 decreases. After this torque reaches zero, the one-way clutching device 62 overruns for the speed change phase of the 1-2 ratio shift.

With the reaction plate 100 moved to the position of FIG. 4a and positioned to further restrict the exhaust port 132, the pressure in chamber 103 increases until the multi-mode clutch is fully locked in the one-way drive mode. After the clutch locks, its capacity may readily exceed the torque that it carries. Since the torque on reaction plate 100 and the resultant axial force generated by camming action no longer increase, the forces acting on the reaction plate 100 are no longer in balance. Accordingly, the reaction plate 100 is displaced to the right by force of the apply fluid in chamber 103. Under such circumstances, the control port 132 is increased in area and the pressure in chamber 132 is reduced until the force balance on the reaction plate is again restored. Accordingly, with the movement of the reaction plate 100 controlling the extent of regulation, 130–160 psi for example, within the multi-mode clutch 90. Any change in the clutch torque corresponding to variation of engine throttle position results in corresponding change in the clutch apply pressure, essentially in a linear curve. This clutch torque/apply pressure matching during the shifts provides for smooth shifting without runaway or sagging shifts.

With the, transmission in the second gear the multi-mode clutch holds the sun gear 44 through the intermediary provided by drum 86 for reaction as the forward clutch 22 transmitting torque from the engine through drum 86 to the ring gear 36. With ring gear 36 being driven and sun gear 44 held, the second ratio output is through the rotating planet gears moving carrier 42 about the axis A to drive the output shaft 47. In this second range the multi-mode clutch 90 is holding the sun gear 44 by its one-way locking capability in the drive mode shown in FIG. 4a.

For a 2-3 powered upshift the multi-mode clutch self releases for an automatic smooth shift transition. For this shift, the valve 150, the third clutch passage or line 151 is open to hydraulic line pressure. Under these conditions, when the third clutch pressure starts rising, the exhaust control valve shifts to move the exhaust control valve spool to the right when the third clutch oil provides a force exceeding that of the spring 146. When shifted to the right the exhaust control valve 136 opens the multi-mode clutch apply chamber 103 through the passage 134 into the exhaust 156. The pressure regulation in chamber 103 provides a self-generating feature to maintain the pressure in chamber 103 just above what is needed to hold the clutch. When the reaction torque in the multi-mode clutch, drops to zero and reverses, the reaction plate 100 starts rotating in the forward direction and the balls 112 automatically roll down in their conical cavities in the manner of a self-releasing one-way roller clutch as the reaction plate retracts by the force of fluid pressure in chamber 103. This action opens the exhaust port 132 to its fullest. Pressure in chamber 103 which has been dropping with the clutch torque, falls to zero so that the multi-mode clutch is fully released. Low clutch capacity of the multi-mode clutch at the point of torque reversal assures that the shift will be automatic and completely smooth and free of any noticeable interference.

With the 1-2 shift valve 126 still upshifted, oil flow through the multi-mode clutch chamber 103 is controlled by a feed orifice 170 in line 128 continues in the third gear range. If this flow loss is considered excessive, the feed line can be intercepted by a small solenoid valve, or by other suitable changes in the oil circuit. Rotation of the reaction plate past the central position where the balls are bottomed in their cavities as a result of torque reversal in the multi-mode clutch in the 2-3 shift, is prevented by the pin 116 which bottoms in the slot 166 as illustrated in FIG. 4.

In a power 3-2 downshift, the transmission is initially in third gear, with forward clutch 22 and direct clutch 80 applied. The 1-2 and 2-3 shift valves 126, 150 are in their upshifted position. The exhaust valve 136 is in the third gear mode with the spool valve 138 displaced to the right so that passage 134 for the multi-mode clutch 90 is opened to exhaust 156. The second range oil from valve 126 is flowing through the feed orifice 170 to chamber 103 and flows therefrom through line 134 to the exhaust as previously described. Accordingly, the oil pressure in piston chamber 103 of the multi-mode clutch is nearly zero.

When the 2-3 shift valve downshifts under power condition, the third pressure oil starts exhausting through an exhaust 174 associated with the 2-3 shift valve so that torque decreases in the piston chamber for the third range or direct clutch 80. With the third pressure oil removed upstream of orifice 149, the exhaust control valve instantaneously returns to its regulating mode so that at the start of the downshift it regulates a tickling or enabling pressure that is being fed into the chamber 103 in the multi-mode clutch. The presence of this enabling pressure in this piston chamber again sets the multi-mode clutch for the one-way automatic lock mode, FIG. 4a, featured by this invention.

Accordingly, in this downshift, a small amount of drag is initially added to the forward rotating clutch plates 94. At this time, the direct clutch plate slip rate is increasing and reaches a point where the multi-mode clutch plate's rotation, stops and starts to reverse, since the sun gear 44 of gear set 44 starts to rotate in the reverse direction. The drag force in the clutch plates 94, 96 of the multi-mode clutch makes the reaction plate 100 turn in the same direction. The resulting camming action of the balls of this clutch on the reaction plate translates this turning motion into simultaneous axial motion which thrusts the reaction plate leftward in FIGS. 1 and 2 as it turns. This motion of the reaction plate restricts the flow through the exhaust port 132 which raises the pressure in piston chamber 103. This increases clutch torque which, in turn, causes the pressure in chamber 103 to rise along with torque.

With the piston 102 moved to a position in the multi-mode clutch in which the friction plates are lightly loaded because of the enabling pressure, the events in powered 3-2 downshift happen instantly in a shifting manner provided by a one-way roller or sprag clutch with an additional degree of control added. Accordingly, the transmission smoothly downshifts from third into second gear ratio.

When the transmission is in the second gear ratio, the forward clutch 22 and the multi-mode clutch 90 are applied with the multi-mode clutch in a one way lock mode (FIG. 4a). The 1-2 shift valve is upshifted and the exhaust control valve 136 regulates pressure in passage 134 and the higher apply pressure in chamber 103 is regulated by the axial position of reaction plate 100 controlling the area of port 132.

For a power 2-1 downshift, the 1-2 shift valve downshifts to cut off pressure oil flow through line 128 to chamber 103. Second oil pressure in chamber 103 decreases at a rate as determined by an orifice accumulator system provided (not shown). The reduced hydraulic force in chamber 103 upsets the force balance on reaction plate 100 causing it to move forward to reduce the outflow of oil which results in a complete closure of the exhaust port 132. With the exhaust port closed, the shift is just like a convention shift from a multi-plate clutch to a free wheeler so that the first gear freewheeler 62 engages as the clutch plates of the multi-mode clutch are released.

For a coast 3-2 downshift, the transmission is initially in the third, or high-range drive, with the forward clutch 22 and direct clutch 80 applied. Under these conditions, the planetary gear set is locked. The exhaust control valve is also in the third gear mode with the spool valve shifted to the right so that the exhaust line 134 is connected into exhaust 156. The 1-2 and 2-3 shift valves 126 and 150 are in their upshifted position. The multi-mode clutch plates 94 are rotated in a forward direction while normal clutch friction turns the reaction plate so that pin 114 bottoms in slot 116 and the reaction plate is held in this position. There is no hydraulic force present in chamber 103.

On a coast 3-2 downshift, the 2-3 valve 150 downshifts and the oil from the third clutch starts exhausting through exhaust 174. With the third oil pressure removed from the diametral end of the exhaust control spool valve 138, the spring 146 shifts the control valve to its regulating mode and the enabling pressure is again introduced in exhaust control line 134. The pressure in the multi-mode clutch chamber 103 increases to equal the exhaust control line pressure and the excess of clutch feed oil is exhausted at the exhaust control valve and small amounts of drag are accordingly introduced in the friction plates of the multi-mode clutch. When the third clutch 80 becomes completely released, the transmission is effectively in neutral and the engine will drop to idle speed. The light drag or friction in the multi-mode clutch will be insufficient to drive the engine. Under these conditions, the second clutch is ready to lock-up instantly if engine power is raised to drive the vehicle.

In a coast 2-1 downshift, the transmission is initially in second gear with the 1-2 shift valve 126 in an upshifted position. The multi-mode clutch is in a coast mode shown in FIG. 4.

On the coast downshift, the 1-2 valve 126 moves to the downshift position, so line 128 is exhausted and the exhaust control valve 136 is displaced to the left by the spring 146. This connects the exhaust control passage 134 with passage 134 allowing faster exhaust of chamber 103 than is possible through the orifice-restricted connection to feed passage 128. Under these conditions, with the multi-mode clutch released, the transmission is in low overrun mode until the vehicle slows down sufficiently for engine idle speed control to take over and the low roller clutch 62 locks for the coast shift into the low range drive.

In power 1-2 shifts in intermediate range, the transmission is initially in first gear with the low roller clutch and forward drive clutch 22 engaged. Also in first gear, the manual valve 160 is positioned so that the passage 162 and spring pocket 147 are pressurized and the spool valve shifts leftward and the multi-mode clutch chamber 103 is open to exhaust 166 in the 1-2 shift valve which is in the down shifted position. The multi-mode clutch plates 94, 96 are completely released with the clutch plates 94 turning in the reverse direction. To start the shift., the 1-2 shift valve 126 upshifts and the second range oil line 128 is pressurized and is also fed to the exhaust control line 134 through the exhaust control valve 136. Initially, the second oil is fed to chamber 103 through orifice 170 and, since the reaction plate 100 is retracted, through exhaust control line 134. This allows rapid filling of piston chamber 103. As the pressure builds up in chamber 103, clutch torque increases and the reaction plate turns and moves axially, blocking the exhaust port 132. Oil can now only enter the chamber 103 through orifice 170 so that the clutch is applied smoothly and in a controlled matter. The remainder of the shift is the same as the drive range power 1-2 shift.

In an intermediate range power 2-1 shift, undertaken when the transmission is in the second gear with the 1-2 valve 126 upshifted, the manual valve is in a position in which the passage 162 leading to the spring pocket 147 of the exhaust control valve is pressurized. The 1-2 valve 126 is upshifted in second ratio so that the second range oil line 128 is open to line pressure and the exhaust control valve is in the manual mode, being displaced to the left by pressure in the spring pocket 147 and by the spring 146 therein so that passage 134 is connected to line 128. The friction plates 94, 96 of the multi-mode clutch are locked from turning in either direction. On the power 2-1 shift, and with both clutch passages 128 and 134 fed with second range oil, the clutch acts like a conventional clutch and the shift is like a typical manual 2-1 downshift with the free wheeler 62 providing reaction as the plates of the multi-mode clutch are released.

Figure 5:
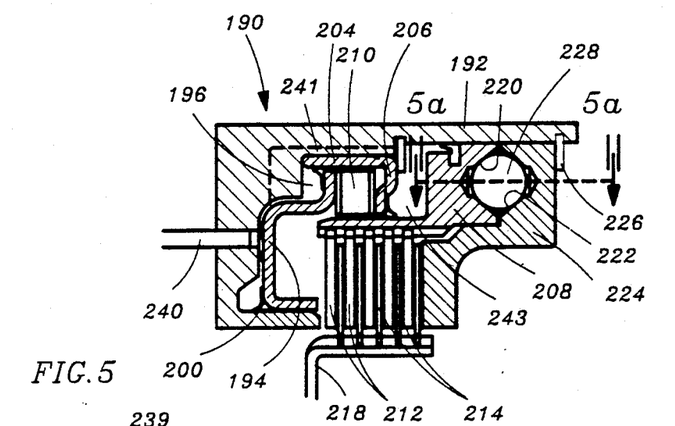
FIG. 5 is a cross-section view of another preferred embodiment of the multi-mode clutch of this invention.

While the multi-mode clutch has been described with a common chamber 103 between the reaction plate 100 and the piston 102, another preferred design is shown in FIG. 5 which has corresponding relationship in operation and construction as the preferred embodiments of FIGS. 1 through 4. More particularly, the multi-mode clutch 190 which, as in the first embodiment, provides one-way engagement in response to the input of torque in a first direction for grounding a planetary gear element such as sun gear 44 of the gearing of FIG. 1 and for the automatic self-release of this element on torque reversal to this clutch for a change in gear ratio.

As illustrated, the multi-mode clutch 190 is an assembly operatively mounted in the case 192 of the transmission, selectively engageable to establish the intermediate gear ratio. This clutch assembly includes an annular stamped sheet metal piston 194 operatively mounted for stroking movement in a cavity within the housing or casing 192 to define a pressure chamber 196 which is adapted to receive pressurized transmission fluid for clutch apply operation. The piston 194 has inner and outer diameter seals 200 molded thereon that respectively slideably seal against a cylindrical shoulder of the casing 192 and a cylindrical rim 204 of a sheet metal retainer 206 that is secured in the casing 192 by a snap-in retainer. The inner diameter of the retainer seats on the extending cylindrical collar of an annular reaction plate 208. This reaction plate is mounted for turning and axial movement within the housing as in the embodiment of FIGS. 1 through 4a. A wave spring 210 is operatively positioned between the piston and the retainer to move the piston to a release position with respect to the interleaved multi-plate clutch pack provided by friction plates 212 and 214, respectively tabbed or splined to the cylindrical collar of the reaction plate 208 and to a connector 218 that is drivingly connected to the sun gear 44 through constructional intermediary such as drum 86 of the FIG. 1 transmission.

Figure 5A:
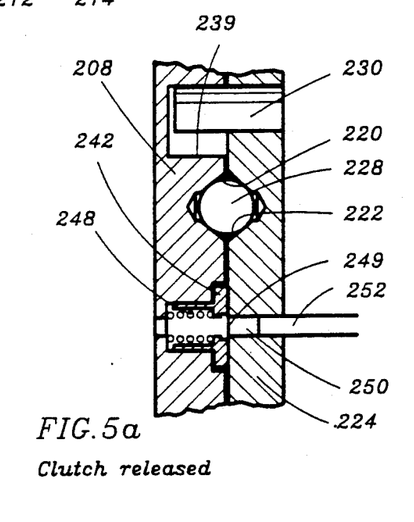
FIG. 5a is a view with most parts in section taken generally along sight lines 5a—5a of FIG. 5.
Figure 5B:
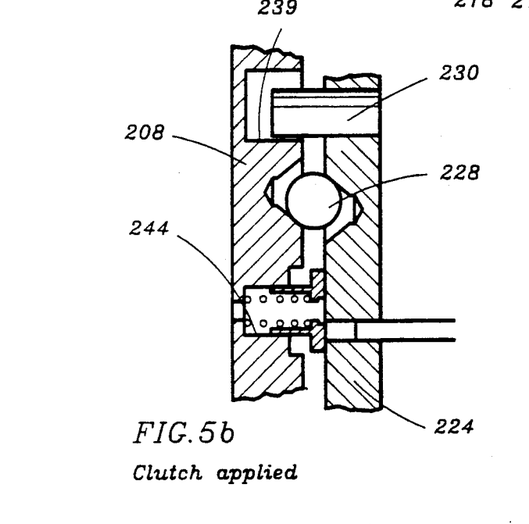
FIG. 5b is a view similar to that of FIG. 5a but showing components in an automatically adjusted position.

The reaction plate 208 has an annular arrangement of arcuately spaced and conical cavities defined by conical walls 220, only one of which is shown in FIGS. 5, 5a and 5b which match corresponding conical cavities defined by conical wall 222 in a backing plate 224 that is secured to the transmission housing 192 by a retainer ring 226. The interfacing conical cavities contain spherical camming balls 228 which are operative as in the embodiment of FIGS. 1-4a to displace the reaction plate outwardly from the backing plate 224 under torque input into the reaction plate under operating conditions. Pin and slot means 230 and 234 are provided in the stationary backing plate 224 and the torque reaction plate 208, respectively, to limit relative rotation of these plates in one direction on torque reversal. This prevents the movement of the reaction plate in turning counterclockwise relative to the pin as shown in FIGS. 3 and 4 of the first embodiment of this invention. Accordingly, with the balls in their bottomed position, torque reversal, counterclockwise in FIGS. 3 and 4, cannot cause the multi-mode clutch to inadvertently engage.

The pressure of apply chamber 196 for the multi-mode piston 194 is supplied with pressure oil from a 1-2 shift valve, such as illustrated in FIG. 2 through line 240 leading into the chamber 193. A passage 241 in the casing 192 connects into chamber 243 between the retainer 206 and the reaction plate 208. Exhaust control for the multi-mode clutch and the apply chamber is by way of a face valve assembly incorporating valve element 242 operatively mounted in a counterbored passage 244 which extends through the reaction plate 208 into communication with chamber 243, as best shown in FIG. 5a. The face valve element 242 is biased against the face of the reaction plate 224 by a helical spring 248 and the discharge opening thereof is adapted to align with a port 249 and associated passage 250 through the reaction plate which connects to an exhaust control line 252. This line connects to an exhaust control valve such as valve 136 shown in the controls of FIG. 2.

In operation such as in a 1-2 shift from the low range one-way roller clutch to the multi-mode clutch 190, pressure is directed from the 1-2 shift valve into chamber 196 to effect the initial engagement of the friction plates 212 and 214. When the friction plates develop sufficient capacity, the torque reaction plate 208 turns in the direction of torque input so that the balls 228 automatically acting as in a one-way roller clutch effect a camming operation to move the reaction plate into a regulated port opening position illustrated in FIG. 5b. Pressure is regulated as the reaction plate 208 turns in opposite directions in response to the opposing forces of fluid pressure on piston 184 and the mechanical force of balls 228 in climbing the ramped sides of their cavities to increase or decrease the port opening 249 in accordance with the torque of the multi-plate clutch. Under these conditions, the pressure of apply fluid in the chamber 196 which is connected to the exhaust port opening through passage 241 in the housing 192 is regulated to exert a force on the piston to match torque requirements of the clutch pack. With clutch torque controlled by the regulation provided by varying the exhaust opening 249, the shifts will be appropriately timed and smoother when the multi-mode clutch is automatically released for upshift into the third gear drive range.

The multi-mode clutch of FIG. 5 is automatically self-releasing in shifts such as a powered 2-3 upshift as explained in connection with the embodiment of FIGS. 1 through 4b.

Figure 6:
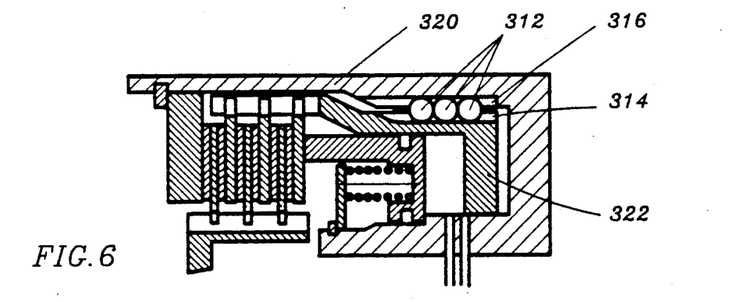
FIG. 6 is a cross-sectional view of another preferred embodiment of this invention.

In FIG. 6, another preferred embodiment of the multi-mode clutch is disclosed which is similar in construction and operation of the multi-mode clutch of the previous embodiments. In the FIG. 6 construction, camming balls 312 are operatively mounted in interfacing, helical slots 314, 316 formed respectively in the wall of the outer cylindrical surface of the reaction plate 322 and the inner wall of the transmission case 320. A pin and slot construction such as illustrated in FIGS. 4, 4a, 5a and 5b is employed so when the reaction plate is in the coast and release mode (FIG. 4 and 5a), it can be turned only to the drive mode (FIGS. 4a and 5b) as described in connection with the previous embodiments. Accordingly, the clutch energizes in one direction of input and automatically deenergizes when the torque reverses. The remainder of this clutch construction and controls are the same as described in connection with FIG. 2 and their operation is the same as described in connection with the FIG. 2 embodiment. Accordingly, the pressure in apply chamber 303 is modulated by the control of area of port 332 by the position of piston 322. Line 328 leads from the 1-2 shift valve and line 328 connects to the exhaust control valve of FIG. 2.

Figure 7:
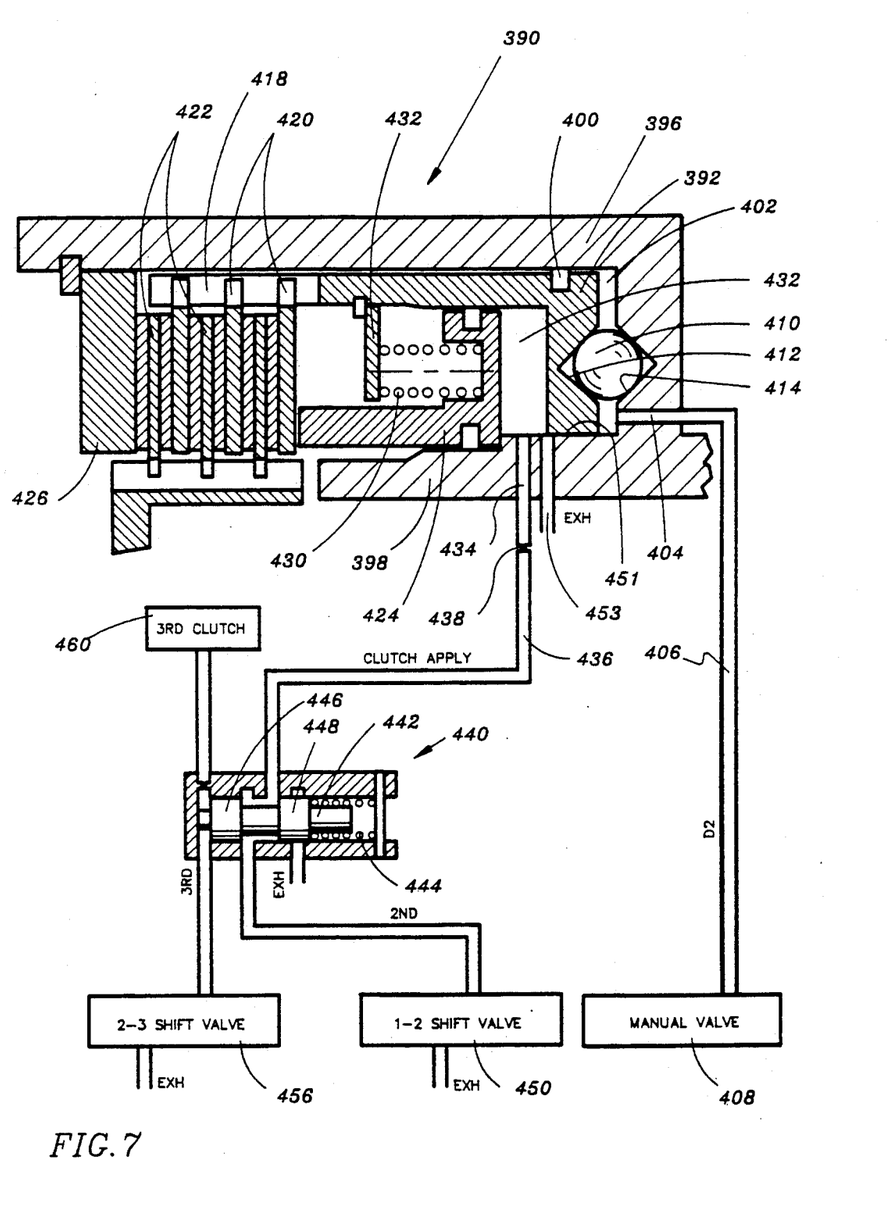
FIG. 7 is a cross-sectional view similar to the view of FIG. 2 showing another preferred arrangement of the multi-mode clutch and controls of this invention.

Another preferred embodiment of the multi-mode clutch is illustrated in FIG. 7 and identified by the reference 390. This multi-mode clutch is generally similar to that of FIG. 2 and has a reaction plate 392 that is mounted for axial turning movement in an annular chamber formed between automatic transmission housing 396 and an axially extending cylindrical support 398 spaced radially inward thereof. The automatic transmission gearing corresponds to that of FIG. 1. The reaction plate 392 is a piston-like member which has an annular seal 400 that slideably engages the inner wall of the housing 396 to form a pressure chamber 402 which has a port 404 communicating therewith that connects to line 406 leading to manual valve 408 of the hydraulic controls.

As in the embodiment of FIGS. 1 through 5b, this multi-mode clutch 390 automatically operates in the manner of a one-way roller clutch and has an annular arrangement of camming balls 410 operatively housed in the interfacing conical recesses formed by the conical walls 412 and 414 in the rear face of the reaction plate 392 and the corresponding inner wall of the transmission housing. This multi-mode clutch further has a pin and slot connection that is like that of FIGS. 4, 4a and 4b to allow rotation and limited turning movement of the reaction plate in a forward direction so that it can be cammed outwardly for clutch engagement and limited from rotation in an opposite direction so that the clutch can be released for smooth ratio shifts and engaged for coast braking.

The reaction plate 392 has arcuately spaced, axial slots 418 formed therein which receive the radially extending tangs of the friction plate 420. These friction plates are interleaved with friction plates 422 which have inner tangs that slideably fit in the splines of a connector member 424 that is drivingly connected to a gear element of the planetary transmission gearing such as sun gear 44 in the FIG. 1 gear set.

An annular backing plate 426 for the multi-mode clutch plate pack formed by friction plates 422 and 424 is secured by a snap ring to the transmission housing 396. This clutch pack is engaged by application of an annular piston 424 operatively mounted within the confines of the reaction member 390 and, as shown in FIG. 7, the inner diameter of this piston is operatively mounted on the reduced diameter shoulder portion of cylindrical collar 398 of the housing 396. Helical return springs 430 mounted on an annular seat 432 fixed to the reaction plate extend into contact with the piston 424 to urge the piston from contact with the clutch pack for releasing the sun gear on the rearward movement of the reaction plate 392. The piston 424 strokes forwardly on the supply of pressure fluid into chamber 432 through port 43 fed through line 436 having restriction 438 therein that connects into a cutoff valve 440. This cutoff valve has a valve element 442 shiftably mounted therein that is moved to the illustrated position by spring 444 so that the lands 446 and 448 are positioned to connect second gear pressure fluid in line 449 from the 1-2 shift valve 450 to the apply piston chamber 432.

A low internal tickling pressure for the multi-mode clutch is provided by the internal construction of FIG. 7. The return spring 430 acting on backing plate 432 urges the reaction plate 392 to the left to restrict exhaust port 451. Opposing force provided by the pressure in chamber 422 urges the reaction plate in an opposite direction, i.e., to the right, to open the exhaust port 451. By selecting the rate of the return spring, a low enabling pressure of 2-5 psi, for example, can be provided in the chamber 432.

As in the other embodiments, the piston and reaction plate and associated constructions of the FIG. 7 embodiment can regulate the higher clutch apply pressure within the apply chamber 432 so that the mechanical and hydraulic forces are balanced. If the hydraulic force in the piston apply chamber at any time exert a force on the reaction plate that exceeds the opposing force exerted by the camming balls, the reaction plate will be moved rearwardly to increase the flow area of discharge opening 451 in the exhaust line 453 to reduce the pressure in the chamber 432 so that the torque capacity of the clutch pack is reduced. Conversely, if the camming balls force exceeds the opposing hydraulic force in the apply chamber 432 exerted on the reaction plate, the reaction plate will be moved forwardly to reduce the flow area of opening 451 effecting a pressure build up in chamber 432 and a resulting increase in the torque capacity of the interleaved clutch plates. Accordingly, this design as the others provide the continuous and beneficial internal regulation of the clutch apply chamber force so that the torque capacity in the multi-mode clutch is at any time sufficient to hold the clutch when it is applied. Importantly, on upshift, the apply pressure will decrease with descending torque to a valve near zero resulting in a smooth self-timed free-wheeler type up-shift.

Figure 8:
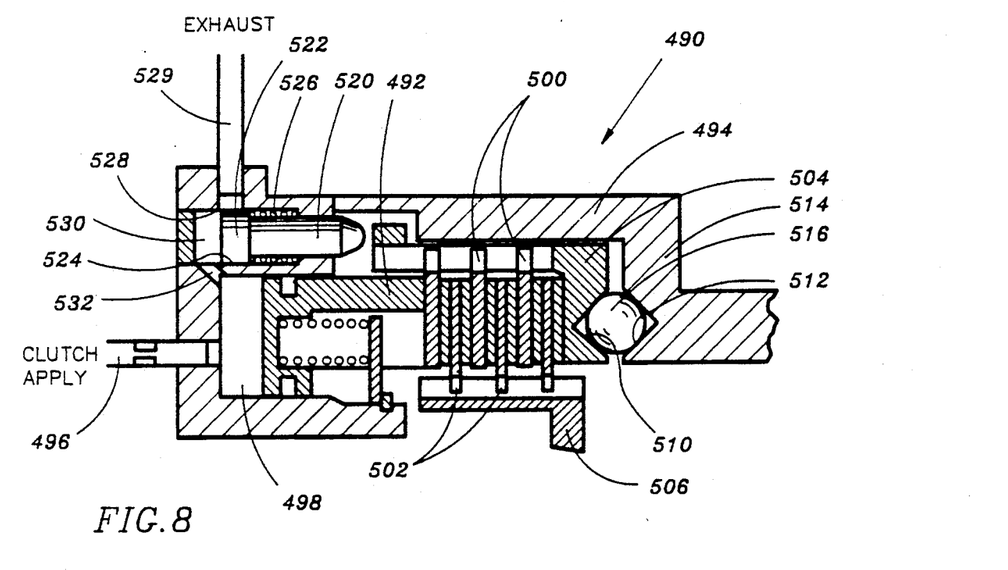
FIG. 8 is a cross-sectional view of another preferred embodiment of the multi-mode clutch similar to the embodiments of FIGS. 2, 6 and 7, but illustrating a reversal in position of the apply piston and a variation in the exhaust control valve.

The multi-mode clutch 490 of FIG. 8 illustrates another preferred embodiment of this invention and shows how the piston reaction plate can be reversed in position and arranged to telescope together for the frictional engagement of the clutch plates to establish the intermediate gear ratio of the transmission of FIG. 1. In this embodiment, an annular piston 492 is arranged for stroking movement in the transmission housing 494 on the supply of intermediate pressure oil through line 496 from the controls similar to FIG. 7 with some modification from the 1-2 shift valve to the apply chamber 498. The piston 492 strokes when the opposing force of return spring is overcome so that the interleaved clutch plate 500, 502 respectively splined or tabbed to the reaction plate 504 and the connector 506 frictionally contact to carry torque. The connector 506 is operatively connected to the planetary gear set such as sun gear 44 of the transmission of FIG. 1. The reaction plate 504 is similar to the reaction plate of the previous embodiments of FIGS. 1, 2 and 7. Interfacing conical ball camming pockets 510 and 512 in the end wall of the reaction plate 504 and the shoulder 514 of the transmission housing or case 494 house spherical camming balls 516. The pockets and camming balls as in the previous embodiments are arranged in an annular pattern about the axis of the transmission. On torque input to the multi-mode clutch pack, the telescopic movement of the reaction plate over the apply piston 492 is effected. Pin and slot means such as shown in FIGS. 3, 4 and 4a control the relative rotation of the reaction plate relative to the pins grounded to the housing.

In this embodiment, an internal regulator valve is employed for regulation of the pressure in chamber 498 when the multi-mode clutch is applied. This regulator valve comprises a valve element having an enlarged cylindrical head 520 and an elongated reduced diameter cylindrical shank 522 mounted for linear movement in a counterbored passage 524. A helical spring 526 operatively mounted in a pocket behind the head 522 of the valve element and acts thereon so that it regulates the pressure by controlling the area of the exhaust port 528 connected to exhaust line 529. To this end, apply pressure in chamber 498 is transmitted to regulator valve chamber 530 by passage 532 The regulator valve moves under the opposing forces of pressure fluid in chamber 530 and the spring 526 to regulate the enabling pressure, for example, 2-5 psi. This enabling pressure ensures the automatic operation of the multi-mode clutch such as in the 3-2 downshift.

As the clutch engages, the mechanical camming force acting on the reaction plate will push the valve element to the left against the hydraulic force in chamber 530 to decrease the area of the exhaust port 528 allowing the pressure to build in apply chamber 498. If the torque of the clutch drops, the balls 516 move down in their ramps. The reaction plate and regulation valve move to the right and the apply pressure in chamber 498 decreases.

For coast braking, exhaust 529 with a conventional valving device used therein, not shown, allows apply pressure to build in chamber 498 to apply the clutch for intermediate drive range engine braking.

It will be appreciated that the foregoing disclosure relates to a preferred embodiment of the invention and is intended to illustrate the invention for purposes of disclosure of the principles thereof and not to disclose all possible changes and modifications which may now be apparent to those skilled in the art. Accordingly, the scope of this invention is set forth in the appended claims.

I claim:

1. A friction drive establishing device for changing gear ratios of a multi-ratio geared transmission for driving a vehicle comprising a housing, a torque sensing reaction member operatively mounted for limited turning and linear axial movement with respect to said housing, a first friction means carried by said reaction member, second friction means adapted to be frictionally engaged with respect to said first friction means so that said first and second friction means develop the capacity for transmitting torque, said second friction means being adapted to be released from said first friction means for interrupting the capacity of said friction means for transmitting torque, support means for supporting said second friction means and for operatively connecting said second friction means to said geared transmission, hydraulically actuated piston means associated with said reaction member, fluid pressure chamber means for said piston means, return spring means associated with said piston means, a fluid discharge port for said chamber means, supply means for supplying fluid pressure to said chamber means to move said piston means from a release position to an apply position in which said first and second friction means develop sufficient torque capacity for changing the gear ratio of the transmission, and one way actuator means associated with said reaction member which automatically responds to torque input in a first direction to said reaction member to displace said reaction member to effect a restricted flow of fluid through said discharge port so that pressure in said chamber increases with increasing torque carried by the said first and second friction means.

2. The friction drive establishing device of claim 1 wherein said discharge port defines a predetermined discharge area and said fluid pressure in said fluid pressure chamber exerts a force on said reaction member which opposes the force exerted by said actuator means to adjustably control the area of said discharge port to thereby limit and regulate the pressure of the fluid in said chamber means.

3. The friction drive establishing device of claim 1 and further including valve means for establishing a tickling pressure in said chamber to provide a force on said piston means to move said piston means to a position in which said first and second friction means are initially engaged prior to effecting a change in the gear ratio of said transmission by operation of said friction drive establishing device.

4. The friction drive establishing device of claim 1 and further including internal valve means associated with said reaction for establishing an initial low pressure in said chamber to provide a low force on said piston means which is operative to displace said piston means to a position to effect an initial physical engagement of said first and second friction means prior to the establishment of a high pressure to said chamber to subsequently effect a change in gear ratio of said transmission by said friction drive establishing device.

5. The friction drive establishing device of claim 1 and further including hydraulic controls for said transmission with separate tickler valve means associated with said discharge port for establishing an initial low pressure in said chamber to provide a low force on said piston means which displaces said piston means to a position to effect an initial physical engagement of said first and second friction means and prior to an increase in pressure in said chamber in response to an increase in the torque capacity of said clutch effecting a change in gear ratio of said transmission by said friction drive establishing device.

6. The device of claim 1 wherein said discharge port extends through a portion of said housing and is progressively restricted by said reaction member as said reaction member moves in the housing to effect an increase in fluid pressure in said chamber.

7. The device of claim 1 wherein said one way actuator means are formed by camming balls and cooperating camming ramps operatively positioned between said reaction member and said housing.

8. The device of claim 7 wherein said balls are forced to climb said ramps on the application of torque to said reaction member in a first direction to effect an increase in torque capacity of said first and second friction means by the restriction of said discharge port and are forced to descend said ramp on the application of torque to said reaction member in a direction opposite to said first direction to thereby effect an automatic release of said first and second friction means.

9. A multi-mode friction clutch for changing the gear of change speed gearing of a power transmission for a vehicle comprising housing means, reaction plate means operatively mounted for limited fore and aft spiral movement in said housing means, means for moving said reaction plate in said housing means, hydraulic chamber means formed by said housing means, first passage for supplying pressure fluid to said chamber means to establish a clutch apply pressure, piston means operatively mounted in said chamber means and associated with said reaction plate means, and first and second selectively engagable friction means respectively connected with said reaction plate means and said gearing and frictionally engagable by movement of said piston means in said chamber means in a first direction to establish a ratio in said change speed gearing, and fluid exhaust means hydraulically connected to said chamber means and controlled by movement of reaction plate means in said housing means to regulate the pressure of said fluid supplied in said chamber means to thereby control the clutch apply pressure therein and the torque capacity of said clutch.

10. The multi-mode clutch of claim 9 wherein said fluid exhaust means communicates with said chamber means and is adapted to be varied in area and exhaust capacity by movement of said reaction plate means in said fore and said aft directions to regulate said clutch apply pressure in said chamber means.

11. The multi-mode clutch of claim 9 wherein said means for moving said reaction plate means in said housing are formed by interfacing camming ramp means in said reaction plate means and in said housing and by camming ball means operatively mounted for movement with respect to cooperating camming ramp means for effecting the selective engagement and the automatic release of said first and second friction means in response to torque reversals applied to said reaction plate means.

12. The multi-mode clutch of claim 11 and further including cooperating pin and slot means operative between said reaction plate means and said housing means to limit the movement of said ball means in said camming ramp means so that said ball and ramp means are effective in only one direction of torque input to said reaction plate means to effect engagement of said friction plate means and are automatically effective in an opposite direction of torque input to said reaction plate means to effect the automatic self-release of said friction plate means.

13. A friction drive establishing device for changing the speed ratio of change speed gearing in a transmission comprising a housing, an annular chamber having an end wall provided by said housing, torque sensing reaction plate means operatively mounted for movement within said chamber having an end wall spaced from and facing the end wall of said chamber, first friction plate means carried by said reaction plate means, second friction plate means operatively connected to said gearing of said transmission interleaved with said first friction plate means, hydraulically actuated piston means operatively mounted in said torque reaction plate means and forming a pressure chamber therewith, means for charging said pressure chamber with pressure fluid to provide a hydraulic force to move said piston means for effecting the frictional engagement of said friction plate means so that said plate means attain at least a minimum torque capacity, return spring means for moving said piston from engagement with said friction plate means, and ball camming means operatively mounted between said end walls of said reaction plate means and said chamber to effect a camming force for the axial movement of said reaction plate means when said reaction plate means is moved to vary the opening of said discharge port until force equilibrium on said reaction plate means is attained between the cam generated force and the hydraulic force in said chamber.

14. The friction drive establishing device of claim 13 and further including control means connected to said discharge port to establish a tickling pressure in said chamber.

15. The friction drive establishing device of claim 13 including a pin and slot connection between said housing and said reaction plate to permit relative rotation of reaction plate in one direction and to limit relative rotation of said reaction plate and said housing in an opposite direction.

16. A torque responsive multi-mode friction clutch assembly operable for effecting the frictional engagement and automatic release of selectively engagable first and second friction means in shifting between different gear ratios of change speed power transmission gearing having input and output means as controlled by said engagement and release of said first and second friction means comprising a housing, reaction plate means mounted for turning and axial movement in said housing, said first friction means being operatively mounted to said reaction plate means, said second friction means being operatively connected to said power transmission gearing and for transmitting torque to said reaction plate means, piston means associated with said reaction plate means for applying a force in a predetermined direction for selectively effecting the frictional engagement of said first and second friction means, one-way actuator means for effecting the engagement of said friction plate means by operation of said piston means in response to application of torque to said reaction plate means in a first direction and to automatically effect the release of said friction plate means by the diminishing of said force by said piston means in response to application to torque to said reaction plate in a direction opposite to said first direction.

17. A multi-mode friction drive establishing device for controlling change speed gearing of a transmission comprising housing means, one way camming means operatively mounted in said housing, reaction plate means associated with said one way camming means and operatively mounted for limited axial movement in said housing means, variable volume hydraulic chamber means formed within said housing means, first passage for supplying pressure fluid to said chamber means, piston means operatively mounted in said housing means and defining a movable extremity of said chamber means and associated with said reaction plate means, and first and second selectively engagable friction means respectively connected with said reaction plate means and said change speed gearing and frictionally engagable in response to axial movement of said reaction plate means and by movement of said piston means in a first direction to establish a ration in said transmission gearing on the supply of pressure fluid to said chamber means, and fluid exhaust means communicating with said chamber means having an exhaust capacity varied by movement of said reaction plate means and enabling pressure valve means in said housing for establishing a tickling pressure in said chamber means to move said piston means in said chamber means to effect an initial low torque engagement of said first and second friction means prior to establishing said high pressure to said chamber means by operation of said reaction plate in decreasing said exhaust capacity of said fluid exhaust means.

18. The multi-mode clutch of claim 17 wherein said enabling pressure valve means is in a discrete spring biased valve element separate from said reaction plate means and is operative to control pressure in an exhaust chamber hydraulically connected between said pressure chamber and said fluid exhaust means.

19. The multi-mode clutch of claim 18 wherein said valve element has a restrictor portion that progressively restricts said fluid exhaust means when displaced in one direction by axial movement of said reaction plate means in response to operation of said camming means so that pressure within said chamber increased to effect the frictional engagement of said first and second friction means.

20. The multi-mode clutch of claim 17 and return spring means operatively interposed between said reaction plate means and said piston means to urge said reaction plate means and said piston means from one another, and enabling pressure valve means being formed by said reaction plate means urged in a first direction by said return spring means and in an opposite direction by pressure fluid in said chamber means to effect the movement of said reaction plate means in said chamber means to control the fluid exhaust capacity of said fluid exhaust means and thereby the pressure in said chamber.

* * * * *

UNITED STATES PATENT AND TRADEMARK OFFICE
CERTIFICATE OF CORRECTION

PATENT NO. : 5,031,746
DATED : July 16, 1991
INVENTOR(S) : Erkki Koivunen

It is certified that error appears in the above-identified patent and that said Letters Patent is hereby corrected as shown below:

Column 19, line 34, delete "ration" and insert --ratio-- therefor.

Signed and Sealed this

Ninth Day of March, 1993

Attest:

STEPHEN G. KUNIN

Attesting Officer     Acting Commissioner of Patents and Trademarks